June 27, 1939.  I. W. HIGGINS ET AL  2,164,272

HYDRAULIC SAFETY DEVICE

Filed May 11, 1938

Ira W. Higgins
Herbert L. Pickett
INVENTOR

BY Victor J. Evans & Co.
ATTORNEYS

Patented June 27, 1939

2,164,272

UNITED STATES PATENT OFFICE 2,164,272

HYDRAULIC SAFETY DEVICE

Ira W. Higgins and Herbert L. Pickett, Chattanooga, Tenn., assignors of one-fourth to Emmett S. Newton and one-fourth to Chester L. Frost, Chattanooga, Tenn.

Application May 11, 1938, Serial No. 207,387

1 Claim. (Cl. 303—84)

The invention relates to a pressure safety device and more especially to a safety cut-off for pressure lines, particularly those of hydraulic brakes commonly employed for automobile equipment.

The primary object of the invention is the provision of a device or cut-off of this character, wherein its arrangement within a pressure line avoids the loss of fluid or the possibility of such pressure line becoming fluid bound, either totally or partially so that successful operation may be had, particularly when the pressure line is a part of the hydraulic brake system for motor vehicles.

Another object of the invention is the provision of a device or cut-off of this character, for the automatic closing of the pressure line in which a leak has occurred so that a very small amount of fluid will be wasted and the braking system will not be inoperative as the braking assemblies for the wheels of such vehicle void of a break or leak will be maintained workable, the assembly having the break or leak existing therein will be the inoperative part of the system until repair or replacement may be had thereby completing the entire system for operation.

A further object of the invention is the provision of a device or cut-off of this character, wherein the construction thereof is novel and is automatic in the working of the same, requiring little or no attention when in service and is readily accessible when the occasion may require.

A still further object of the invention is the provision of a device or cut-off of this character, which is extremely simple in its construction, thoroughly reliable and efficient in operation, compact, strong, durable, and inexpensive to manufacture and install.

With these and other objects in view, the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing.

Similar reference characters indicate corresponding parts throughout the several views in the drawing.

Figure 1:
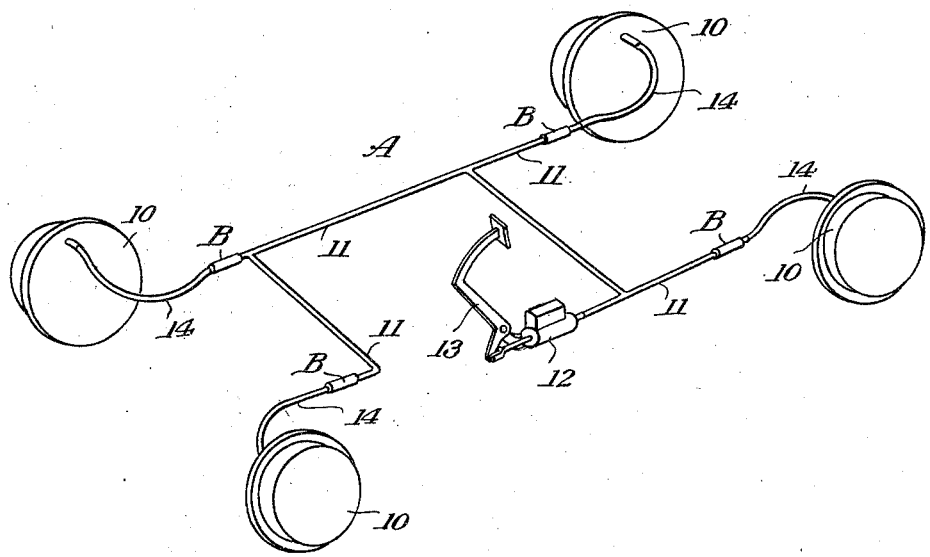
Figure 1 is a perspective view of a hydraulic brake system commonly equipped with motor vehicles and showing the device or cut-off constructed in accordance with the invention in association with said system.
Figure 2:
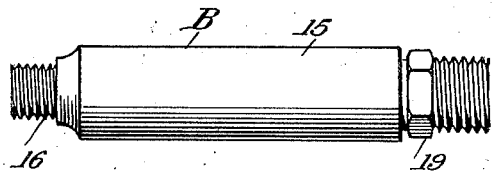
Figure 2 is a side elevation of the device.
Figure 3:
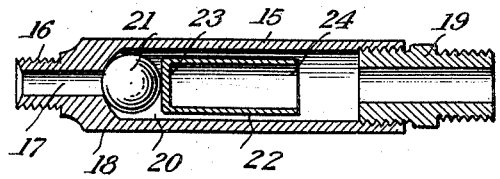
Figure 3 is a vertical longitudinal sectional view thereof.

Referring to the drawing in detail, A designates generally the hydraulic brake system having the usual cylinder and piston assemblies and other features as may be common thereto, each hydraulic braking assembly being identified at 10 while leading to these assemblies, in this instance four in number, are the usual pressure lines 11 operatively connected with a master cylinder 12 whose piston is operated by the usual foot pedal 13. These lines 11 usually consist of piping from the master cylinder 12 to points near the wheels (not shown) of the motor vehicle and from such points extend flexible hose 14 to the wheels, permitting necessary movements of the latter. It is desirable to introduce into each pressure line 11 at any desired point a safety device or cut-off denoted generally at B and by preference the device B is arranged between the hose 14 and the line 11 companion thereto and such device or cut-off may be fixed to the chassis frame of the motor vehicle in any appropriate manner.

All of the safety devices or cut-offs B are of identical construction and hence a specific description of one will suffice.

Each safety device or cut-off B comprises a cylindrical body 15 of uniform cross sectional diameter throughout the major length thereof, being horizontally disposed in each line 11 and at one end is a reduced nipple 16 externally threaded having a bore or passage 17 centrally therethrough and opening into a valve seat 18 interiorly of the said body 15. The body 15 at the other end thereof has internally threaded therein a coupling or union 19, this being attached to the line 11 next thereto while the nipple 16 is attached to the hose 14 companion to said line.

The interior of the cylindrical body 15 forms a valve chamber or way 20 for a spherical or ball valve 21 to be accommodated in the seat 18 for closing the bore or passage 17 when so seated while within this chamber or way 20 is a hollow follower or piston 22, being closed at the end 23 next to the valve 21 while the opposite end 24 is open and the same is next to the union or coupling 19. Due to the inherent weight of the ball valve 21 and the follower or piston 22, they normally rest at the lowermost portion of said cylindrical body 15 away from the seat 18. This follower or piston 22 in its cross sectional diameter is considerably less than the cross sectional diameter of the chamber 20 and similarly the diameter of the valve 21 is less than the cross sectional diameter of the said chamber 20 so that these, when pressure is applied thereto, will be driven or become displaced within the chamber in the body 15 for the automatic working of the device or cut-off.

Now when a break or leak takes place in a hose 14 the valve 21 becomes seated at 18, the said follower or piston 22 under the action of pressure within the line 11 common to the broken or leaky hose moves the said valve 21 to the seat 18 closing the bore or passage 17 and in this fashion eliminates the possibility of a waste of the fluid within the system and at the same time such system is operative in connection with the other lines 11 thereof common to the remaining hose 14 devoid of breaks or leaks so that braking action may be had and the system operating automatically in part until the break or leak has been cured or corrected whence the entire system becomes completely operative.

The fluid in the lines 11 at opposite ends of each device B is normally passive or in equilibrium. The ball 21 and follower 22 through inherent weight maintain the seat 18 clear and as long as there is no leak in either of said lines extending from the ball seat end of the respective devices, the said ball and piston will not interfere with the flow of fluid for applying the brakes because no great amount of pressure is needed therefor. The pressure of the fluid on operating the pedal 13 may be carried to the braking assemblies 10 for the application thereof, that is to say, those of the hydraulic type, the release of these brake assemblies of the mentioned kind being conventional.

It is, of course, understood that the device or cut-off hereinbefore is usable in pressure lines constituting a part of equipments other than the hydraulic brake systems and this is contemplated within the scope of the invention.

What is claimed is:

A safety device for a hydraulic brake system having a main source of fluid supply, fluid pressure brake mechanisms, lines leading from said supply to the brake mechanisms, comprising a cylindrical body horizontally arranged in each line and having end openings communicative with the latter therethrough, a weighed spherical valve in said body for checking flow of fluid therethrough from the source of supply through the line when the latter is broken and normally inactive when the line is unbroken, a seat at one open end for said valve, and a tubular follower closed at one end and open at the other loosely disposed within said cylindrical body with its closed end next to the valve on the side thereof opposite to the checking side of said valve and the open end confronting the open end of the cylinder remote from the valve seat, the valve and follower being of equal diameters considerably less than the internal diameter of the cylindrical body.

IRA W. HIGGINS.
HERBERT L. PICKETT.